Sept. 20, 1932.   P. ALCALÁ   1,878,256
PASTRY MACHINE
Filed Jan. 16, 1931   2 Sheets-Sheet 1
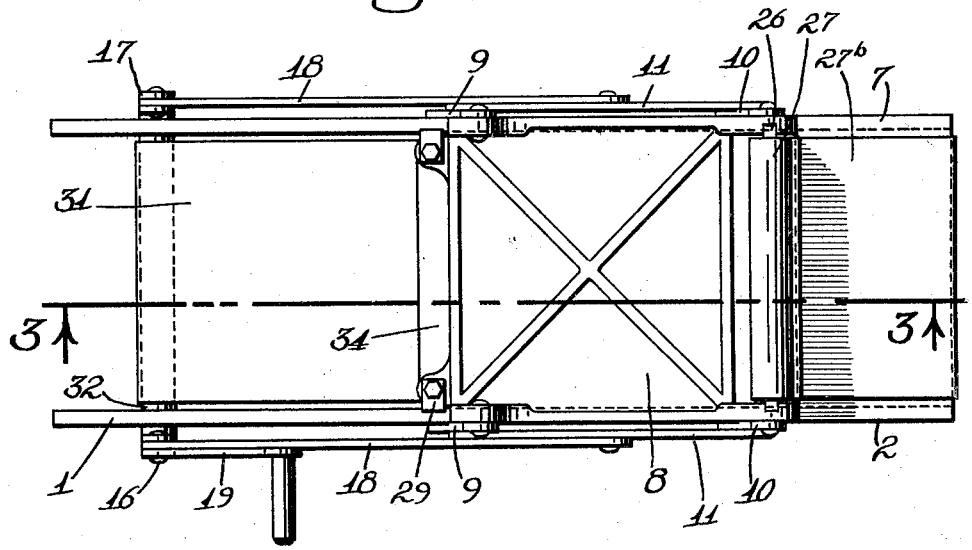
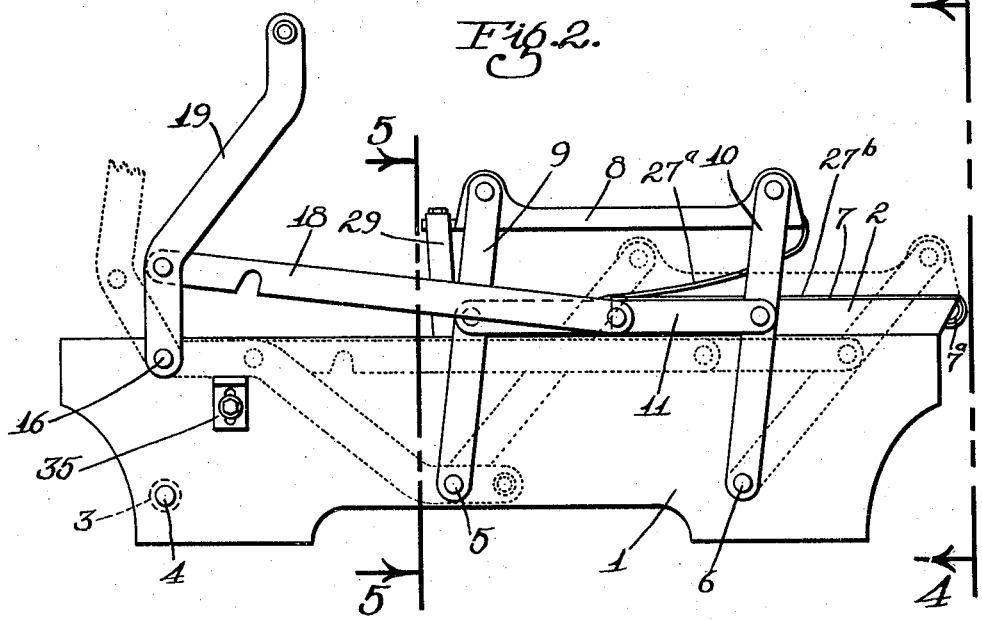
INVENTOR
PABLO ALCALÁ
BY A. B. Bowman
ATTORNEY

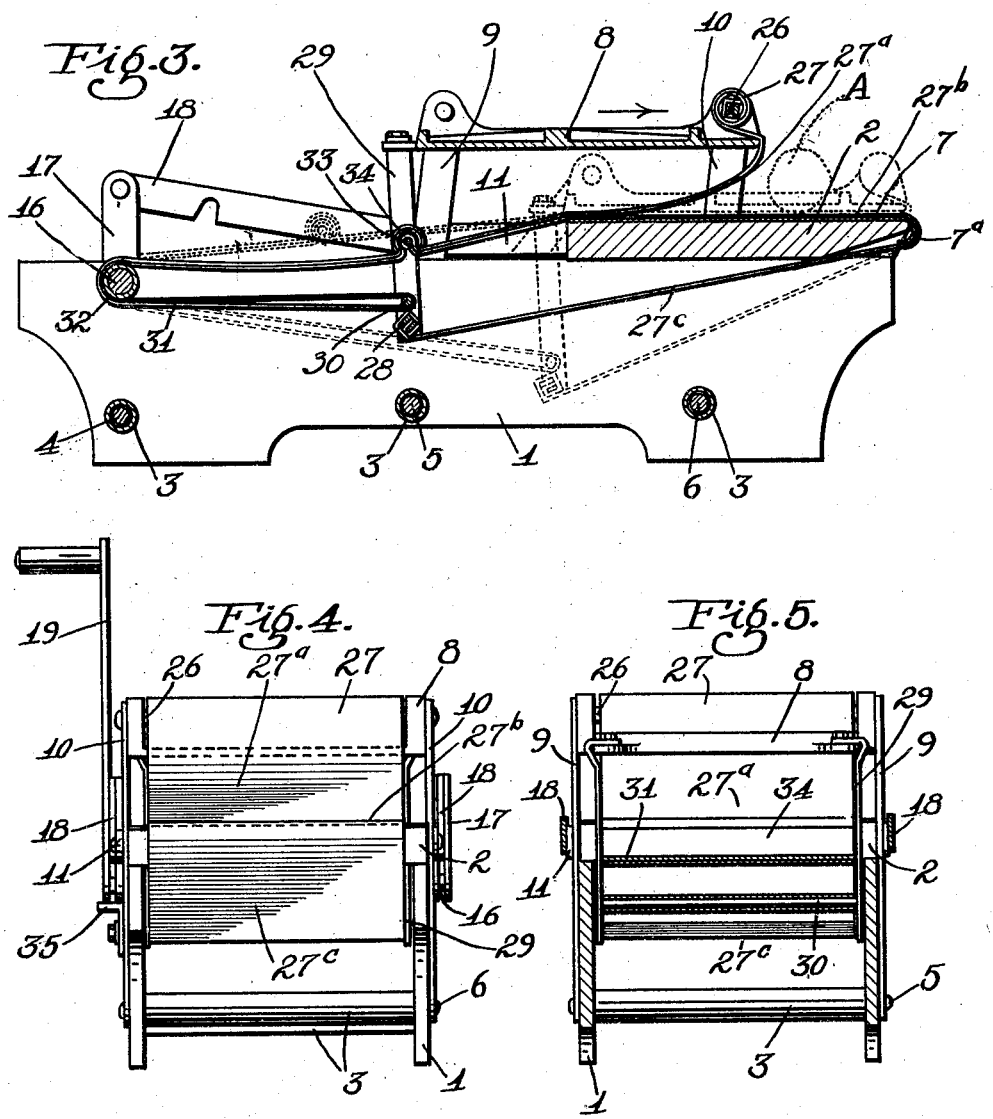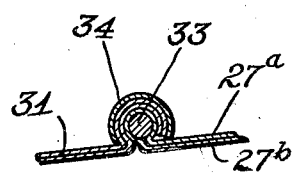

Patented Sept. 20, 1932

1,878,256

UNITED STATES PATENT OFFICE

PABLO ALCALÁ, OF LOS ANGELES, CALIFORNIA, ASSIGNOR TO AL PFISTER AND JAMES I. COUSINS, BOTH OF PASO ROBLES, CALIFORNIA, AND A. C. SEGARRA AND E. ROURE, BOTH OF LOS ANGELES, CALIFORNIA

PASTRY MACHINE

Application filed January 16, 1931. Serial No. 509,140.

My invention relates to pastry machines. The objects of this invention are: first, to provide a machine of this class whereby dough or a similar soft and moldable product may be flattened or formed into a relatively thin sheet or layer of the dough or other product and at the same time into substantially circular form for making tortillas, enchiladas, pastry of various kinds, cookies and the like; second, to provide a machine of this class whereby the dough or other product will be pressed into flat and circular form irrespective of the shape of the mass of dough or other product placed on or in the machine preparatory to forming the same; third, to provide a machine of this class in which the dough or other product is formed as herein described by and between a pair of plates directed or forced toward each other by simple angular or diagonal movement of the plates with respect to each other; fourth, to provide a machine of this class in which the forming plates are directed and forced toward and in opposed parallel relation to each other by a simple parallel bar mechanism and by a simple lever and link mechanism; fifth, to provide a machine of this class whereby the dough or other product may be formed into layers of varying thicknesses by a simple adjustment of the machine; sixth, to provide a machine of this class in which the dough or other product may be formed as herein mentioned without any cutting operation, without any waste whatever and without re-working or re-molding the dough; seventh, to provide a machine of this class whereby the formed product will be delivered completely formed at one end of the machine when the forming plates are separated for the next forming operation; eighth, to provide a machine of this class in which the formed product will not adhere to the forming surfaces; and, ninth, to provide as a whole a novelly constructed machine of this class, one which is simple and economical of construction, simple and economical to operate, efficient in its action, one which may be easily kept sanitary, one which is durable and which will not readily deteriorate or get out of order.

With these and other objects in view, as will appear hereinafter, I have devised a pastry machine having certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a plan view of my machine in one form of construction; Fig. 2 is a side elevational view thereof taken from the operator's side of the machine; Fig. 3 is a longitudinal sectional view thereof taken through 3—3 of Fig. 1; Fig. 4 is an end elevational view thereof taken at 4—4 of Fig. 2; Fig. 5 is a transverse sectional elevational view thereof taken through 5—5 of Fig. 2; and, Fig. 6 is an enlarged sectional view of the means for securing portions of the conveyor and other flexible members together.

Like characters of reference refer to similar parts and portions throughout the views of the drawings.

The frame of the machine, illustrated in the drawings, consists of a pair of side frame members 1 secured together at one end of the upper edges by a plate or board 2, and at its lower portion from front to rear by a plurality of spacers 3 and bolts 4, 5 and 6.

At the upper side of the plate 2, if the same is made of wood, is secured a forming plate 7 which may be turned downwardly at its forward or discharge end, as indicated by 7a. This forming plate is stationary. Above and backwardly from the plate 7 is a movable forming plate 8 which is, in this instance, at all times parallel to the plane of the plate 7 and is shiftable angularly or diagonally towards the plate 7 until the two plates are positioned in substantially directly superimposed relation. The plate 8 is supported at the opposite sides of the machine and at the opposite side edges of the plate by pairs of arms 9 and 10, which are hereinafter referred to as parallel bars. The arms or bars 9 and 10 at each side of the machine are pivotally mounted at their lower ends on the bolts 5 and 6, while the upper ends are pivotally connected to the plate 8. Thus, it will be seen that since the plates 7 and 8 are parallel and the bars 9 and 10 are parallel, the plates 7 and 8 will always be positioned parallel to each other irrespective of the direction in which the plate 8 is shifted with respect to the plate 7. The arms or bars 9 and 10 at each side of the machine are preferably connected intermediate their ends by a link 11.

At the rear end of the machine is rotatably mounted a rockshaft 16 which extends between and beyond the side frame members 1. On this rockshaft at the outer sides of the frame are secured arms 17 which are pivotally connected at their free ends to links 18, which links are pivotally connected at their forward ends to the links 11 intermediate the ends of the latter. It will be noted that the links 18 are connected to the links 11 so as to increase the length of the links 18. On the rockshaft 16, at the end thereof nearest the operator, is mounted an operating handle 19 for rotating the rockshaft and thereby shifting the plate 8 toward and away from the plate 7.

At the forward end and preferably at the upper side of the plate 8 is removably mounted an arbor on which is mounted a roll of sheet material 27 which may be in the form of rubberized fabric. The arbor 27 is non-rotatable, but is readily removable so that a portion of the sheet material may be unwound for easily and quickly renewing the worn out portion of the sheet material. The free end of this sheet material extends backwardly in loop form, as indicated by 27a, and then forwardly over the top of the plate 7, as indicated by 27b, and then around the forward rounded end of the plate 7 and backwardly between the side frame members 1, as indicated by 27c. The rear end of the latter portion 27c is secured to a bar or arbor 28 extending between and supported by and at the lower ends of arms 29. These arms 29 extend downwardly from the rear edge of the plate 7 between the side frame members 1, but adjacent the inner side thereof, as shown best in Fig. 5. Also supported by the arms 29 and above the bar or arbor 28 is a removable rod 30 over or around which is looped a flexible member 31, which may be of the same materials as the flexible sheet 27. This flexible member 31 which serves primarily as a connecting belt, extends around a roller 32, mounted on the rockshaft 16, and then toward the rear end of the looped portion 27a of the sheet member 27. The forward end or edge of the flexible member or belt 31 is secured to the looped portion 27a, as shown best in Fig. 6. The securing means in this instance consists of a rod 33 loosely positioned at the rear end of the looped portion 27a, and a channel member 34 of more than semi-circular extent. The forward end of the flexible member or belt 31 is extended around the looped rear end of the portion 27a and the channel member 34 is extended around the forward end of the member 31, thus readily detachably securing the sheet members 27 and 31 together. Thus, there is formed an endless loop which extends over the upper side of the plate 7 and a portion of which is drawn back and forth over the plate by the arms 29.

The operation of the machine is briefly as follows:

A piece of dough or other similar product, as indicated by A in Fig. 3, is placed upon the portion 27b of the flexible sheet in front of the plate 7. The handle 19 is then rotated in a clockwise direction forcing the plate 8 in the direction of the arrow and at the same time forcing the same angularly or diagonally toward the plate 7. The portion 27b is drawn backwardly from the forward end of the plate 7 causing the piece of dough or other product to be brought under the plate 8 and the portion 27a of the flexible sheet, compressing the piece of dough or other product. This piece of dough or other product will be pressed into circular form of uniform thickness. When the plate 8 is forced forwardly, all of the flexible members become taut, as indicated by dotted lines in Fig. 3, thus providing smooth forming surfaces at the adjacent sides of the forming plates. The handle is then shifted in a counter clockwise direction, causing the plates to separate, the portion 27b of the flexible member 27 to be drawn forwardly over the plate 7 and conveying the formed product over the forward edge of the plate 7 into the hand of the operator or on to any suitable receptacle or conveyor, not shown.

The thickness of the formed product may vary depending upon the limit of space between the plates 7 and 8. This space is adjusted by a stop 35 at one side of the machine. This stop is adapted to be engaged by one of the arms 17 as the same is shifted forwardly.

It will be here noted that when the operating lever 19 is shifted to substantially its extreme forward position, the pivotal connection between the lever 19 and the link 18 is substantially in alignment with the pivotal axis of the arms 17 and the pivotal connection between the links 18 and the links 11. Thus, considerable force may be exerted by the lever 19 in forcing the plates 7 and 8 together.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a machine of the class described, a pair of plates positioned in spaced and substantially opposed relation with respect to each other, means for forcing said plates angularly toward and in spaced parallel relation with respect to each other, a flexible sheet covering for one of the plates, and means for drawing said flexible sheet covering over and parallel to the surface of the latter plate and in a substantially opposite direction to the movement of the other plate when the plates are forced together.

2. In a machine of the class described, a support having a forming plate thereon, pairs of parallel bars positioned at the opposite sides of the support and at the opposite edges of the plate and pivotally mounted at one end on and at the side of the support, the opposite ends of the bars extending above the plane of the plate, a second forming plate positioned in parallel relation to the first plate and pivotally supported at the upper ends of said bars, an operating lever pivotally mounted on the support, and a link connecting the lever to the parallel bars for shifting the same and forcing the second plate toward the first plate, and an adjustable stop for limiting the movement of the parallel bars and the second plate for varying the space between the plates when the same are forced toward each other.

3. In a machine of the class described, a pair of parallel forming plates, pairs of parallel bars positioned at the opposite side edges of the plate, the coincident opposite ends of the parallel bars at the opposite side edges of the plate being pivoted and pivotally fixed with respect to each of the plates, means for forcing said plates toward each other in an angular direction in said parallel relation, and adjustable means for varying the separation between said plates when the same are forced toward each other.

4. In a machine of the class described, a support, a plate mounted on and at one end of the support, a pair of arms at the opposite sides of the support, the arms of each pair being pivotally mounted in spaced apart relation and at their lower ends on the opposite sides of the support, a second plate pivotally mounted between the pairs of arms and supported at the upper ends of the arms, the pivotal connections of the arms with the second plate being spaced apart a distance equal to the distance between the pivotal axes of the arms mounted on the support, an operating lever mounted at one side of the support and at the end thereof opposite the first plate, and a link pivotally connecting said arms to the operating lever intermediate the ends of the latter.

5. In a machine of the class described, a support, a plate mounted on and at the end of the support, a pair of arms at the opposite sides of the support, the arms of each pair being pivotally mounted in spaced apart relation and at their lower ends on the opposite sides of the support, a second plate pivotally mounted between the pairs of arms and supported at the upper ends of the arms, the pivotal connections of the arms with the second plate being spaced apart a distance equal to the distance between the pivotal axes of the arms mounted on the support, an operating lever mounted at one side of the support and at the end thereof opposite the first plate, and a link pivotally connecting said arms to the operating lever intermediate the ends of the latter, said operating lever, when shifted, forcing said plates toward and in close spaced parallel relation, the pivotal axis of the lever and the pivotal connections of the link with the arms and the lever being substantially in alignment when the plates are in their contracted positions with respect to each other.

6. In a machine of the class described, a support, a plate mounted on and at one end of the support, a pair of arms at the opposite sides of the support, the arms of each pair being pivotally mounted in spaced apart relation and at their lower ends on the opposite sides of the support, a second plate pivotally mounted between the pairs of arms and supported at the upper ends of the arms, the pivotal connections of the arms with the second plate being spaced apart a distance equal to the distance between the pivotal axes of the arms mounted on the support, an operating lever mounted at one side of the support and at the end thereof opposite the first plate, a link pivotally connecting said arms to the operating lever intermediate the ends of the latter, and a variable stop in connection with the lever for variously limiting the spaced apart relation of said plates when the same are forced toward each other.

7. In a machine of the class described, a support having a forming plate thereon, pairs of parallel bars positioned at the opposite sides of the support and at the opposite edges of the plate and pivotally mounted at one end on and at the side of the support, the opposite ends of the bars extending above the plane of the plate, a second forming plate positioned in parallel relation to the first plate and pivotally supported at the upper ends of said bars, and a sheet member secured at one end to one end of the second plate and with its opposite end freely around the corresponding end of the first plate and looped backwardly between said plates.

8. In a machine of the class described, a support having a forming plate thereon, pairs of parallel bars positioned at the opposite sides of the support at the opposite edges of the plate and pivotally mounted at one end on and at the side of the support, the opposite ends of the bars extending above the plane of the plate, a second forming plate positioned in parallel relation to the first plate and pivotally supported at the upper ends of said bars, a sheet member secured at one end to one end of the second plate and with its opposite end portion freely around the corresponding end of the first plate and looped backwardly between said plates, and means carried by the second plate for drawing the latter end portion of the sheet over the end of and under said first plate when the plates are separated, and also for drawing the looped portion of the sheet member between said plates and backwardly from said ends of the plates when the plates are forced together.

9. In a machine of the class described, a pair of plates positioned in spaced and substantially opposed relation with respect to each other, means for forcing said plates angularly toward and in spaced parallel relation with respect to each other, a flexible sheet covering for one of the plates, and means for drawing said flexible sheet outwardly beyond one end of the latter plate when said plates are separated.

10. In a machine of the class described, a pair of plates positioned in spaced and substantially opposed relation with respect to each other, means for forcing said plates angularly toward and in spaced parallel relation with respect to each other, for flattening a piece of dough, and means in connection with one of the plates for drawing said flattened dough beyond the end of the latter plate when said plates are separated.

11. In a machine of the class described, a support, a plate mounted on and at one end of the support, a pair of arms at the opposite sides of the support, the arms of each pair being pivotally mounted in spaced apart relation and at their lower ends on the opposite sides of the support, a second plate pivotally mounted between the pairs of arms and supported at the upper ends of the arms, the pivotal connections of the arms with the second plate being spaced apart a distance equal to the distance between the pivotal axes of the arms mounted on the support, an operating lever mounted at one side of the support and at the end thereof opposite the first plate, a link pivotally connecting said arms to the operating lever intermediate the ends of the latter, a conveyer positioned over the first plate, around the forward end thereof, and below and backwardly therefrom, and means in connection with the second plate for operating the conveyor for drawing the conveyer outwardly over the first plate when the second plate is shifted.

12. In a machine of the class described, a support a plate mounted on and at one end of the support, a pair of arms at the opposite sides of the support, the arms of each pair being pivotally mounted in spaced apart relation and at their lower ends on the opposite sides of the support, a second plate pivotally mounted between the pairs of arms and supported at the upper ends of the arms, the pivotal connections of the arms with the second plate being spaced apart a distance equal to the distance between the pivotal axes of the arms mounted on the support, an operating lever mounted at one side of the support and at the end thereof opposite the first plate, a link pivotally connecting said arms to the operating lever intermediate the ends of the latter, a conveyer positioned over the first plate, around the forward end thereof, and below and backwardly therefrom, means in connection with the second plate for operating the conveyor for drawing the conveyer outwardly over the first plate when the second plate is shifted, and a flexible sheet member extending from the forward end of the second plate backwardly between said plates and secured to the upper portion of the conveyer.

13. In a machine of the class described, a pair of plates positioned in spaced and substantially opposed relation with respect to each other, means for forcing said plates angularly toward and in spaced parallel relation with respect to each other, a flexible sheet portion positioned over the lower plate, a second sheet portion positioned loosely below the upper plate, and means for drawing said sheet portions between said plates in a substantially opposite direction to the movement of one of the plates when the plates are forced together and for drawing said sheet portions in the opposite direction when said plates are separated.

In testimony whereof I have hereunto set my hand at Los Angeles, California, this 9th day of January, 1931.

PABLO ALCALÁ.